Patented Apr. 29, 1930

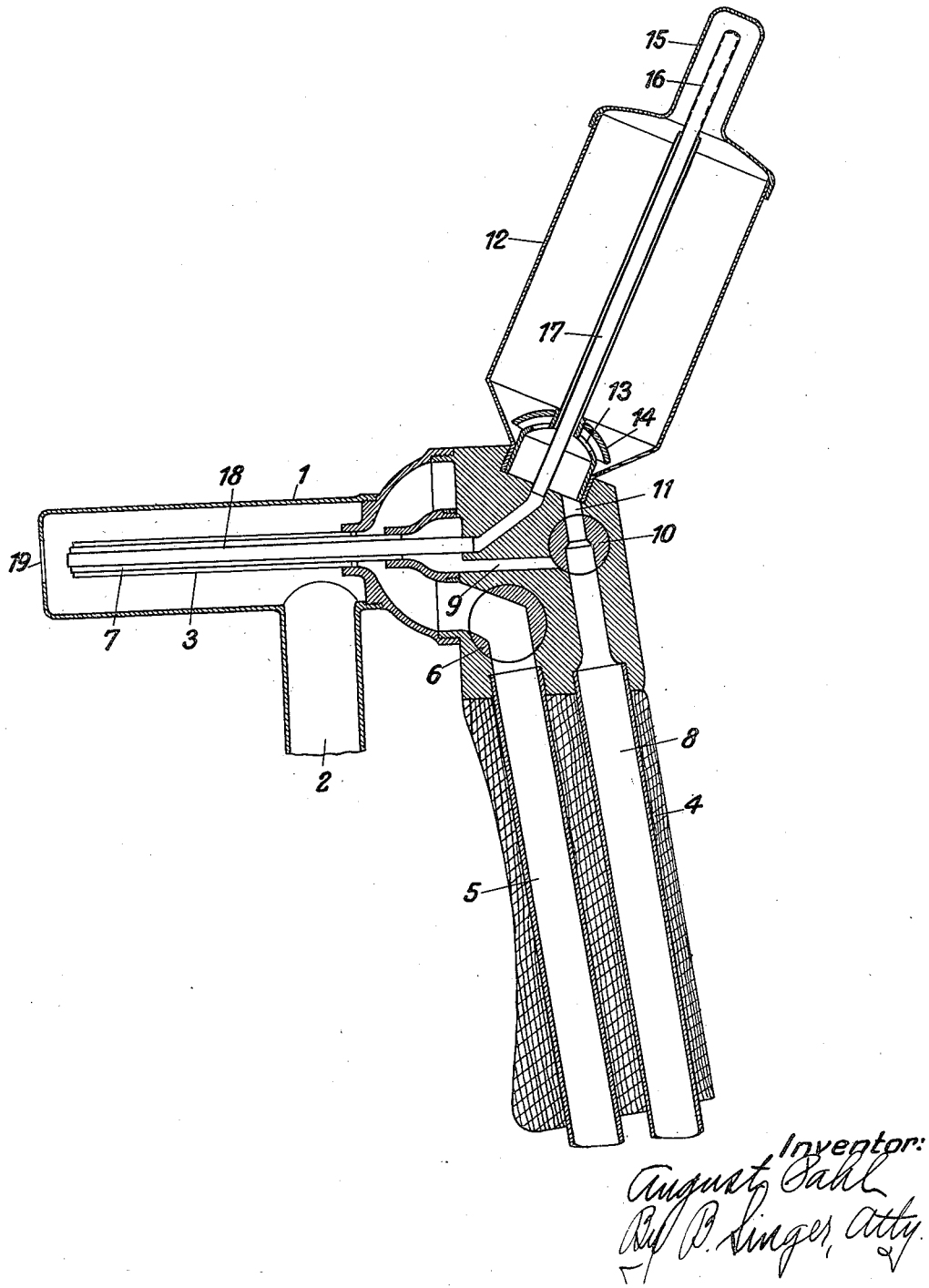

1,756,381

UNITED STATES PATENT OFFICE

AUGUST PAHL, OF BERLIN-WILMERSDORF, GERMANY

APPARATUS FOR THE PRODUCTION OF MOLTEN LIQUID, COATS OF ENAMEL, GLASS, AND THE LIKE BY SPRAYING UPON METAL, STONE, OR OTHER SURFACES OR BODIES

Original application filed January 28, 1927, Serial No. 164,327, and in Germany February 25, 1925. Divided and this application filed June 25, 1927. Serial No. 201,495.

It is already known to apply coatings of enamel, glass, quartz or the like in liquid form to various materials, for example, metal, by subjecting the coating material, for example, enamel, in the form of a powder to the action of a flame in which it is melted, and then blowing the coating material in a molten state through the lamp itself on to the object to be coated.

The known processes, however, are open to objection due mostly to the fact that the material blown on in a molten condition does not adhere compactly to the previously warmed surface to which it is applied but forms a coating which is porous in places, so that a subsequent heating is nearly always necessary.

The object of the present invention is to provide apparatus for carrying out my improved process which is described and claimed in my copending application for Letters Patent of the United States, filed January 28, 1927, Serial Number 164,327, of which this specification is a division, and to enable powdered material in its unmelted condition, that is to say while still in the form of a powder, to be blown by the blow flame on of a powder, to be blown by the blow flame on of previously warmed portions of the object to be coated in accordance with my said process.

The accompanying drawing is a sectional view of an apparatus constructed and arranged in accordance with this invention and for carrying out the said process.

Referring to the drawing, 1 is a mixing chamber having a tube 2 for the supply of gas and an air pipe 3 arranged concentrically inside the mixing chamber, compressed air being led to this air pipe 3 through the tube 5 arranged in the pistol shaped butt 4, the quantity of air being regulated by a valve or rock 6. The attachment for turning the valve 6 is arranged on the side of the butt 4, but for the sake of simplicity is not shown on the drawing. The outer end of the tube forming the mixing chamber or burner 1 is partly closed and has an opening 19 so that said outer end forms a nozzle.

Concentrically disposed with regard to the pipe 3 and of such diameter as to leave a space between them is a further tube 7 to which compressed air can be led through the tube 8 in the butt 4, along the channel 9, by turning the tap or cock 10 in the butt 4 until its bore is open to the channel 9. The cock 10, however, can also be adjusted so as to close the channel 9 while the tube 8 remains in communication through the bore of the tap with the channel 11, in axial alignment with channel 8. The channel 11 opens into the container 12 which is firmly secured to the butt 4 and holds the spraying material. The compressed air enters the container laterally through the openings 13 which are screened off by a plate 14, passes through the mixture in the container 12, carries away a portion and leads this portion through the perforations in a tube 16 which is enclosed in a cover 15, into the tube 17, and from there into the discharge pipe 18 arranged concentrically in the tube 7. This matter mixed with compressed air thus passes through the flame burning at the opening 19 of the mixing chamber 1 at a high velocity, without becoming unduly heated, that is to say, without becoming plastic or even liquid. The quantity of the material as also its discharge velocity can be regulated by adjusting the tap 10, so that the compressed air can either be led completely through the tube 8 along the channel 11 into the container 12 in order to carry away the material, or one portion of the compressed air led into the channel 11, and another portion of the compressed air into the channel 9, so that the mixed current discharging through the pipe 18 is uniformly jacketed by a current of compressed air passing through the channel and along the tube 7, and is thereby further protected from the effect of the flame.

In order that the preliminary heating of the surface to be treated may be effected rapidly without the blow flame having to be first played for a long time over a certain portion of the surface without any material being introduced, preliminary warming means for example, a series of burners (for coating a fairly large surface) can be inserted in front of the actual blow flame, thus rendering it possible to obtain an easier equalization of the differences of temperature which would otherwise ensue owing to the local heating of a part of the surface to be coated to the melting temperature of the coating. It can also be arranged in such a way that two or more blow flames are symmetrically arranged (say in a circle) the flames of which cover one and the same part of the object to be coated, while the coating material is blown on to the same part by a current lying concentrically in the axis of the blow flames.

When it is desired to coat a larger amount of surface at the same time, the blow flames can be arranged in several series alongside or below each other.

Having thus described my invention, what I claim is:

1. Apparatus of the class described, comprising a container, a duct to discharge powder from the container, said duct having an intake end at an elevated point in the container and above the level of the powdered material in the container, a burner tube in which the discharge end of the first named duct is arranged, said burner tube having a gas intake and also having a discharge opening, a duct for compressed air leading to the lower portion of said container and provided with a controlling valve, a duct in the burner tube arranged around and spaced from the discharge portion of the first named duct and a duct for compressed air leading to the inner end of the last named duct, the discharge ends of the last named duct and of the powder discharge duct being opposite the discharge, burner opening, of said burner tube.

2. Apparatus as claimed in claim 1, including a duct leading from the first named compressed air duct and an intermediate duct between said concentric with the discharge portion of the powder discharge duct and the last named duct and to which intermediate duct the said duct which leads from the first named compressed air duct discharges and also including a valve to control both the first named compressed air duct and the said duct which leads therefrom to the intermediate duct.

3. Apparatus for the production of molten liquid coats of enamel, glass, quartz and the like upon metal, stone or other surfaces, comprising a chamber for containing the coating material in powder form, a handle carrying said chamber, and having a duct for compressed air, said duct communicating with said chamber a burner tube extending from said handle, a tube extending longitudinally of said chamber, and having perforations at its outer end, said tube discharging into said burner tube, a valve controlling the passage of the air to said chamber, a second duct in said handle controlled by said valve, a tube connected to said second duct, a third tube surrounding said second tube, a compressed air duct in said handle connected to said third tube, a valve for controlling said last named compressed air duct, a burner tube surrounding the tubes before referred to, and forming a mixing chamber therearound, said burner tube having an inlet for gas and also having a mixture discharging burner opening to which the discharge ends of the first, second and third named tubes are presented.

In witness whereof I affix my signature.
AUGUST PAHL.